United States Patent
O'Keefe

(10) Patent No.: US 8,665,846 B2
(45) Date of Patent: Mar. 4, 2014

(54) COMMUNICATION SYSTEM, APPARATUS AND METHOD FOR ANTENNA ARRAY CONTROL

(75) Inventor: Conor O'Keefe, Douglas (IE)

(73) Assignee: Socowave Technologies Limited (IE)

( * ) Notice: Subject to any disclaimer, the term of this patent is extended or adjusted under 35 U.S.C. 154(b) by 258 days.

(21) Appl. No.: 13/201,587

(22) PCT Filed: Feb. 10, 2010

(86) PCT No.: PCT/EP2010/051643
§ 371 (c)(1),
(2), (4) Date: Oct. 18, 2011

(87) PCT Pub. No.: WO2010/092078
PCT Pub. Date: Aug. 19, 2010

(65) Prior Publication Data
US 2012/0044917 A1    Feb. 23, 2012

(30) Foreign Application Priority Data
Feb. 13, 2009 (GB) .................... 0902407.6

(51) Int. Cl.
*H04W 4/00* (2009.01)
*H04M 1/00* (2006.01)

(52) U.S. Cl.
USPC ............................ 370/338; 455/562.1

(58) Field of Classification Search
USPC ...................... 370/338; 455/562.1
See application file for complete search history.

(56) References Cited

U.S. PATENT DOCUMENTS

| 6,094,165 A | 7/2000 | Smith |
| 6,304,762 B1 * | 10/2001 | Myers et al. ............... 455/562.1 |
| 6,314,305 B1 | 11/2001 | Solondz et al. |
| 6,900,775 B2 * | 5/2005 | Shapira ..................... 343/844 |
| 7,792,532 B1 * | 9/2010 | Narayanabhatla et al. ... 455/447 |
| 2005/0101352 A1 * | 5/2005 | Logothetis et al. ........ 455/562.1 |
| 2009/0163214 A1 * | 6/2009 | Trigui et al. ............... 455/446 |
| 2012/0196591 A1 * | 8/2012 | O'Keeffe et al. ............ 455/427 |

FOREIGN PATENT DOCUMENTS

| CN | 1346221 A | 4/2002 |
| EP | 1458205 A2 | 9/2004 |

OTHER PUBLICATIONS

Office Action from the Chinese Patent Office, Chinese Patent Application No. 201080016606, dated Sep. 23, 2013, including an English language translation (25 pages).

* cited by examiner

*Primary Examiner* — Kenny Lin
(74) *Attorney, Agent, or Firm* — Barnes & Thornburg LLP

(57) ABSTRACT

A wireless communication system comprises a network element (315) operably coupled to an antenna array for communicating with a remote wireless communication unit (305). The antenna array comprises a plurality of radiating elements where at least one first radiating element of the plurality of radiating elements is arranged to create a radiation pattern that comprises a sector beam (405). The plurality of radiating elements comprises at least one second radiating element arranged to create a major portion of at least one sub-sector beam (420, 425, 430) within the sector beam (405).

23 Claims, 9 Drawing Sheets

COMMUNICATION SYSTEM, APPARATUS AND METHOD FOR ANTENNA ARRAY CONTROL

FIELD OF THE INVENTION

The field of the invention relates to active antenna array control for use in a wireless communication system and in particular, but not exclusively, to a multiple beam-form enhanced antenna array for a code division multiple access (CDMA) receiver.

BACKGROUND OF THE INVENTION

Currently, 3rd generation (3G) cellular communication systems are being developed to further enhance the communication services provided to mobile phone UEs (user equipment). The most widely adopted 3rd generation communication systems are based on Code Division Multiple Access (CDMA) technology, namely Wideband Code Division Multiple Access (WCDMA). Carrier frequencies are used for uplink transmissions, i.e. transmissions from a mobile wireless communication unit (often referred to as wireless subscriber communication unit or user equipment in $3^{rd}$ generation systems) to the communication infrastructure via a wireless serving base station (referred to as a Node B in $3^{rd}$ generation systems) and downlink transmissions, i.e. transmissions from the communication infrastructure to the mobile wireless communication unit via a wireless serving base station (e.g. Node B). A further description of CDMA, and specifically of the Wideband CDMA (WCDMA) mode of Universal Mobile Telecommunication System (UMTS™), can be found in 'WCDMA for UMTS', Harris Holma (editor), Antti Toskala (Editor), Wiley & Sons, 2001, ISBN 0471486876.

CDMA communication, as used in 3G mobile communications air interface technologies, is an 'interference limited' technology from a data throughput perspective. CDMA technology utilises orthogonal variable spreading factor (OVSF) codes combined with pseudo noise (Pn) codes to differentiate multiple UEs that are utilising the same spectrum at the same time for uplink access on the Uu radio interface. In order to maintain sufficient signal-to-interference ratio (SIR) protection for all UEs on accessing the Node B, up-link (UL) power control (PC) is dynamically managed by the network infrastructure. SIR estimation is commonly derived from pilot tones in the uplink (UL) dedicated physical control channel (DPCCH). User equipment (UE) devices transmitting to a Node B on the same spreading factor (SF) code would be arranged such that their respective transmissions have substantially the same power when received at the receiving node B. Often, up to ninety six UEs are simultaneously supported in call mode for a specific Node B.

CDMA technologies are known to have a relatively robust performance to multi-path effects. CDMA uses the multi-path signals and combines them to make an even stronger signal to be received at, and processed by, the respective receivers. An example of a known CDMA wireless receiver 100 is illustrated in FIG. 1. The CDMA wireless receiver 100 comprises an antenna 102 receiving a radiated signal and providing the received radiated signal 104 to radio frequency (RF) circuitry 106. The RF circuitry 106 provides a frequency down-converted and filtered signal 108 to an analog-to-digital converter (ADC) 110, which in turn provides a digital representation 112 of the received signal to a RAKE receiver 114. CDMA receivers use rake receivers, which is essentially a set of several digital parallel-configured versions of the received signal often referred to as rake fingers. The RAKE receiver 114 comprises receive filter 116 arranged to filter the digital representation 112 and provide the filtered digital signal 188 to a RAKE finger bank 118 and path selection logic 120. The path selection logic 120 is, in essence, one of the rake receivers and is arranged to constantly search for different multi-path signals. The path selection logic 120 feeds the information, via RAKE control signal 122, to the other rake fingers in the RAKE finger bank 118. Each rake finger of the RAKE finger bank 118 then selects the signal corresponding to a recursively strongest multi-path, and provides an output received signal 124, as selected by the RAKE control signal 122, to a maximum ratio combiner 126 to combine the respective RAKE received signals to make the composite signal stronger. The RAKE finger bank 118 also provides a signal 198, which is an estimate of a selected RAKE path performance.

In a WCDMA system, as deployed for 3G, signal 198 could be the signal-to-interference ratio (SIR) estimate from the pilot tone recovered in the dedicated physical control channel (DPCCH) or could be estimated within the dedicated physical data channel (DPDCH) being processed. This signal is used by channel estimation logic 130, which provides a channel estimation signal 132 to the maximum ratio combiner 126. The maximum ratio combiner 126 is able to combine appropriate RAKE received signals under control of the channel estimation signal 132 and provide a suitable RAKE received signal 134 to channel codec logic 136 for decoding. The decoded RAKE received signal is then output 140 from the RAKE receiver 114.

Conventional antenna arrays, comprising multiple antenna elements and used with existing Node B equipment in most 3G installations, utilise a fixed +/−65° beam pattern. Outside of the main lobe of the antenna beam the signals are spatially filtered and significantly attenuated. Conventional network planning and passive antenna array solutions process all incoming signals with a common fixed beam pattern. This receive processing based on signals received within the geographic area identified by the antenna main lobe, tends to dictate a corresponding common beam pattern for transmitter operation. Thus, an identical radio frequency (RF) footprint is used for both receive (Rx) and transmit (Tx) operation.

Rx beam-forming using antenna arrays depends on the ability to constructively add incident signals on each of the antenna elements in a way that coherently adds those from the desired direction. Thus, incident signals that are not from the desired direction will be incoherently added, and thus will not experience the same processing gain. The term 'coherency' implies that the signals will have substantially the same phase angle when added beam forming process. In addition, thermal noise from multiple sources also exhibits incoherent properties, and thus when added the signals from multiple sources do not experience the same processing gain as a coherent desired signal.

Conversely, in transmit active antenna arrays, the signals are coherently combined within the intended beam pattern as electromagnetic (EM) signals in the 'air' so that they arrive coherently at the mobile station (MS) (e.g. UE) receiver.

In a Node B antenna array, the received RF signal from a single UE cannot be discerned without demodulation of the composite signal. Individual receive beam-forming for a specific user is not feasible, since there is likely to be multiple received signals of the same power from different UEs simultaneously at the antenna array. Even if few UEs are utilising the Node B, the likelihood is that the signals would be below the noise floor of the Node B's receiver. The processing gain of the WCDMA receiver implies that the signal can be extracted from the noise floor. This, however, requires at least a partial demodulation process.

An example of a known cellular network plan 275 is also illustrated. The Cellular network plan utilises cells 280 in a "honeycomb" cellular structure. Cells are divided into sectors 285. Typically, three sectors exist per cell corresponding to approximately 120° coverage per sector. One sector corresponds to a radiation pattern of a single conventional antenna array whose beam pattern of +/−65° maximally covers the sector. Six sector cells, though less common, are utilised in some network configurations. CDMA and WCDMA technologies are able to use a single modulated RF carrier frequency for all uplink users on all cells and sectors within those cells. Likewise, a single carrier frequency is used for downlink on all cells in the network and all sectors within these cells. Furthermore, each sector antenna RF signal is processed independently by its respective receiver or transmitter.

To those skilled in the art it will be known that a cellular hierarchy consists of a macro cell for wide area geographic coverage and micro, pico and femto cells used for small localised coverage within the macro geographic structure. In some cases the micro, pico and femto cells may use the same frequency as that of the macro cell. Since the micro, pico and femto cells are used for in-fill coverage, their radiative antenna units will not be sharing the same physical site as the antennae used in the macro sector.

A WCDMA receiver is illustrated in Chapter 5 of the book, titled: "Smart Antennas: State of the Art" (Eurasip Book Series on Signal Processing & Communications), edited by Kaiser et al ISBN-10: 9775945097 and authored by Klemens Freudenthaler et al. Chapter 5 deals with maximum ratio combining (MRC) space time Rake receiver, and considers independent Receivers from independent antenna combined through an MRC implementation. There is no beam-forming prior to the rake receivers. As a consequence, this proposal provides no spatial filtering to the RAKE receiver and is at a disadvantage from a noise perspective as the processing gain from the beam former is eliminated. Noise is suppressed in beam-forming by virtue of being uncorrelated. Conversely, the wanted received signal has correlative properties at the combining stage of the beam-former. In addition, this system also suffers from the feedback effect of convergence on to the strongest received WCDMA signal. This convergence time, particularly when multi-path signals change abruptly, can cause impaired link performance.

Referring now to FIG. 2, a known antenna array beam-forming arrangement 200 for a CDMA receiver is illustrated. The antenna array beam-forming arrangement 200 comprises multiple antennas 205, 215 coupling received signals to receivers 210, 220 comprising radio frequency (RF) receiver front-end circuits arranged to down convert received RF signals to baseband, analogue-to-digital converters arranged to convert the down-converted signals to a digital form and digitally filtered using a Root of Raised Cosine (RRC) matched channel filter arranged to extract the received signal. Each respective output from the RRC filter is input to beam-forming-space-time RAKE receiver function 225.

The beam-forming-space-time RAKE receiver function 225 comprises a spatial combining function comprising a delay estimate 235 arranged to estimate respective delays of the received signal at each antenna of the antenna array. The output of the delay estimate 235 is then input to a function that calculates a plurality of spatial weight vectors to be applied to beam-forming logic 245, 250, each of which additionally receive the RRC filtered output from their respective receiver. Following convergence, the beam-forming logic 245, 250 outputs a signal whose SIR is maximised. This signal is further processed in a multi-path (temporal) combining function 255 that comprises a RAKE receiver finger bank 260 receiving the plurality of beam-form corrected signals. The RAKE receiver finger bank outputs are input to a multipath combiner 265 where they are constructively combined and input to the usual channel decoding 270 process, etc.

However, a known problem associated with such processing of the received strongest multi-path signal is that the multi-path signals may change quickly due to only a small movement in a UE's location, angular position or motional objects within the signal scattering environment. As a consequence, antenna beam-forming techniques, where the beam has a relatively narrow beam, are rarely used in CDMA systems. This is due to the fact that a communication link is prone to being lost when the multi-path effect changes, and the use of narrow-beam, beam-forming antenna arrays exacerbates this effect. Thus, in known systems, the use of antenna array beam-forming has not been as widely adopted as it may have been, as dedicating UEs to single narrow beams has drawbacks in a mobile environment that has to accommodate multi-path signals. For example, in certain communication scenarios such as communications in urban environments, an undesirable, widely-scattered, received signal may result from a use of narrow-tracked antenna array beam-forming. To extract the full benefit from such a widely-scattered, received signal, narrow beam processing is ill advised as the complete multi-path combining effects of using rake receivers is made redundant and degraded performance ensues.

Furthermore, in conventional antenna systems for cellular communications, the transmit/receive beam pattern is often controllable using electromechanical beam steering elements, such as mechanical phase shifters. Thus, beam steering is currently performed remotely by manipulation of electromechanical elements of an antenna array located at the top of the antenna mast. Electromechanical beam manipulation is limited to minor changes in tilt (typically up to 10°). Electromechanical phase shift beam manipulation does not extensively change the main beam shape.

In order to address the limited flexibility associated with electromechanical phase shifter beam manipulation on an antenna array located at the top of the antenna mast, there has been recent interest in the use of smart or active antenna technology. This is a radio technology where the antenna system has dedicated signal processing per antenna array element or co-located antenna and signal processing units. The active antenna technologies fall into three broad families.

(i) multi-antenna systems (MAS);
(ii) radiohead with or without multiple in-multiple out (MIMO) signals; and
(iii) radio-array.

It is known that active array antenna technology is able to facilitate independent and variable beam patterns in both directions.

Modern air interface protocols, such as WCDMA, allow multiple UEs to simultaneously transmit to the base-station on the uplink on a single carrier frequency. A minimal limit of signal to noise per bit (Eb/No) ratio is required on the uplink channel to ensure adequate bit error rate (BER). This implies that the higher the data rate for a particular UE at least a proportionally better Carrier to interference plus noise ratio (CINR) is required to maintain Eb/No.

As the cell becomes more loaded, all UEs have to compensate by increasing transmit power so as to maintain Eb/No at the Node B receiver, since other UEs will add to the interference level. Likewise UEs requiring higher data rate services will require all UEs to compensate for higher Eb/No required of the Node B. This increase in transmit power by the UE can be detrimental to network performance. The increased power levels in the cell propagate to neighbouring cells forcing that cell to increase power levels to maintain Eb/No even though it may not be loaded heavily.

This effect proposes a number of problems to WCDMA networks. For example, the noise floor of the communication cell is increased, which in turn causes a propagation effect on the network and reduces data transmission rates. Furthermore, UE devices consequently consume more power, as Uplink transmissions are required to operate at higher power levels. In addition, limitations exist on maximum throughput per cell as a result of dynamic range limitations imposed on UE transmissions.

A further enhancement to the above proposed techniques is provided in the paper, titled: "Maximum ratio combining of correlated diversity branches with imperfect channel state information and colored noise", authored by Schmitt et al. and published in 'Spread Spectrum Techniques and Applications, 2004 IEEE Eighth International Symposium 30 Aug.-2 Sep. 2004, pages 859-863. Schmitt et al consider multiple active beam-forming branches that are MRC combined and show the benefits of up to 6 dB Eb/No for processing multiple beams. Unfortunately, the implementation proposed by Schmitt et al., for use in a node B would increase the amount of complexity in signal processing four-fold as each receiver path would require a full complement of dedicated Rake receivers.

Schmitt et al. also propose an arrangement that only supports a plurality of narrow beams. This can be to the detriment of propagation cases where there are wide scattering properties, and, thus, full coverage of the cell sector is undermined.

Consequently, current techniques are suboptimal. Hence, an improved mechanism to address the problem of supporting active antenna array technology in a wireless communication network, for example in utilising and processing multi-beam capability on an up-link communication channel to improve air interface (Uu) link performance, would be advantageous.

SUMMARY OF THE INVENTION

Accordingly, the invention seeks to mitigate, alleviate or eliminate one or more of the above mentioned disadvantages singly or in any combination.

According to a first aspect of the invention, there is provided a wireless communication system comprising a network element operably coupled to an antenna array for communicating with a remote wireless communication unit. The antenna array comprises a plurality of radiating elements where at least one first radiating element of the plurality of radiating elements is arranged to create a radiation pattern that comprises a sector beam. The plurality of radiating elements further comprises at least one second radiating element arranged to create a major portion of at least one sub-sector beam within the sector beam wherein the at least one sub-sector beam and the sector beam use the same carrier frequency.

A carrier frequency in the context of the descriptions contained herein encompasses the centre frequency of the uplink or downlink modulated RF signal confined to one channel spacing bandwidth. To those skilled in the art, it is known that frequency offsets may exist in the centre frequency between different wireless devices, for example due to errors on device frequency generation and Doppler effects for moving devices. As such a small tolerance is provided for in this definition specified in PPM (parts per million). For the purposes of clarity, this is constrained in one example, to be within say, 20 ppm of the centre frequency. Channel spacing bandwidth for example in WCDMA systems is defined to be 5 MHz.

Thus, in one embodiment of the invention, multiple digital receive patterns (for example in a form of sub-sector beams) may be formed and digital signal processing ((DSP) implementing active array technology) may then exploit the spatial filtering of the beam forming process. The invention may allow improved use of the communication resources in the communication system, for example, in a sector where UE angle of arrival signals are equally distributed spatially. Thus, for an uplink UE with a beam arrival concentrated on any one of the sub-sector beams, the sub-sector beams may contain substantially less interference from other users as compared to the received signal being processed as an entire beam. Thus, as a result, an improvement in SIR performance may be achieved, thereby improving the quality of the air interface link. Furthermore, such a communication system may be leveraged by already developed 3GPP™ standards in order to provide improved link performance on 3G WCDMA systems.

According to an optional feature of the invention, the sector beam is created by 'first beam-former' logic and at least one sub-sector beam is created by 'second beam-former' logic such that the sector beam and at least one sub-sector beam are of a common polarisation. Thus, signals incident on the antenna array of a fixed polarisation may be processed independently to extract the coherent properties of the incident signal. Cross polarisation antennas may also be used to extract polar diverse signals from the air interface; due to the fact that for signals that are diverse, coherent properties are unlikely to exist.

According to an optional feature of the invention, the plurality of radiating antenna elements comprises a co-located fulcrum of beam creation. In this manner, the sector beam and the at least one sub-sector beam may partially overlap, and may emanate from substantially the same antenna elements to have a co-located fulcrum of beam creation.

According to an optional feature of the invention, at least one sub-sector beam may be created such that it has a narrower horizontal or vertical azimuth angular radiation pattern than the created sector beam.

According to an optional feature of the invention, the antenna array comprises an active antenna array supporting dedicated signal processing per antenna array element. Thus, the ability to alter the radiative beam shape on a per antenna array radiating element basis may be achieved. Furthermore, the signal from each receiver may be operably coupled to a plurality of beam former logic modules, thereby allowing multiple received radiative patterns to be processed.

According to an optional feature of this invention virtual antenna elements could be used in the sector beam-forming process or the sub-sector beam forming process.

According to an optional feature of the invention, the wireless communication system may be a $3^{rd}$ Generation Partnership Project, 3GPP™, wideband code division multiple access, WCDMA, cellular communication system. Thus, communication systems and communication units that use various forms of the CDMA technology may readily employ the inventive concept herein described. In addition, the processing of additional sub-sector beams in such WCDMA systems may be used to improve link performance.

According to an optional feature of the invention, a network element, for example a serving wireless communication unit (such as a Node B) may comprise or may be operably coupled to beam-former signal processing logic comprising at least the 'first beam-former' logic and 'second beam-former' logic and arranged to separately process signals associated with the sector beam and at least one sub-sector beam. Furthermore, in one optional embodiment, the network element may comprise or may be operably coupled to rake receiver logic comprising a plurality of rake receivers operably coupled to the beam-former signal processing logic and may be arranged to separately receive signals associated with the sector beam and the at least one sub-sector beam. Thus, the sector beam and at least one sub-sector beam may be processed separately, which may improve link performance. Furthermore, incident signals whose maximal input signal falls within the said sub-sector beam may exhibit improved Eb/No.

According to an optional feature of the invention, a first number of the plurality of rake receivers associated with processing the sector beam may be greater than a second number of the plurality of rake receivers associated with processing the at least one sub-sector beam. In current Node B equipment adding a full complement of rake receivers per beam consumes a significant signal processing overhead. Thus, according to this optional feature, it may be possible to optimally utilise rake receiver resources, for example by utilising a reduced number of rake receivers and employing a resource loading algorithm.

According to an optional feature of the invention, the beam-former signal processing logic may be arranged to process the sector beam and the at least one sub-sector beam that may comprise diversity logic arranged to utilise polarisation diversity to one or more of the sector beam and the at least one sub-sector beam. Thus, signals from UE antennas of various angular positions may benefit from Node b receiver antenna arrays optimally selecting signals from a diverse polarisation, thereby further improving link performance.

According to an optional feature of the invention, polarised diversity reception may be processed in a similar manner to the primary receiver path for those receivers that are able to use CDMA technology utilise polarised diversity reception.

According to an optional feature of the invention, a data communication link may be used to interface data streams between functional subsystems of a serving wireless communication unit. These subsystem elements may for example include data communications link between the RF subsystem and the Base band subsystem. This interface partition could for example be between the beam-former function and the de-spreading function. This communication link could be a serial link and conform to an interface such as Open BaseStation Architecture Initiative (OBSAI) RP3 or the Common Public Radio Interface (CPRI) specification.

According to an optional feature of the invention, the network element, such as a serving wireless communication unit, may comprise allocation logic that may be arranged to selectively allocate at least one remote communication unit in a communication path that employs polarisation diversity. Thus, by limiting the rake receiver resources to less than the full complement required for the sector beam path, a substantial reduction in the processing functions of the serving communication unit may be achieved.

According to an optional feature of the invention, the network element, such as a serving wireless communication unit, may comprise or may be operably coupled to multi-user detector (MUD) logic operably coupled to the plurality of rake receivers and arranged to minimise signal interference on a plurality of remote communication units based on the plurality of outputs from the rake receiver logic. In a WCDMA system, logic can be optionally employed to solve the near-far problem. MUD provides one option that aims to reduce the interference from other users sharing the same frequency. Typical approaches are designed to minimize the mean square error (MMSE) to linearly retrieve the user of interest. Other approaches to MUD may also be employed, such as radial basis functions to retrieve the user of interest. Thus, use of MUD logic in combination with the previous feature may provide further enhancements to the uplink performance.

According to an optional feature of the invention, the network element, such as a serving wireless communication unit, may comprise or may be operably coupled to maximally ratio combining logic arranged to respectively combine signals received on the sector beam and combine signals received on at least one sub-sector beam for each uplink channel. In one optional embodiment, the maximally ratio combining logic may apply different proportionality constants to signals from each rake receiver output path. In one optional embodiment, the maximally ratio combining logic may apply a weighting on each remote wireless communication unit signal on each receiver path associated with the sector beam created by the first beam-former and the at least one sub-sector beam created by the second beam-former. Thus, MRC optimally combines signals from different paths such that the signal to interference plus noise ratio is maximised, resulting in overall improved link performance.

According to an optional feature of the invention, the network element, such as a serving wireless communication unit, may comprise allocation logic arranged to allocate receiver fingers of the plurality of rake receivers to received signals according to at least one from a group of: spreading factor of the received signal; transmit power control, TPC, of the received signal. According to an optional feature of the invention, the allocation logic may be arranged to first allocate receiver fingers of the plurality of rake receivers to received signals according to at least one from a group of: a lowest spreading factor of the received signal; a highest transmit power control, TPC, of the received signal.

According to a second aspect of the invention, there is provided a network element, such as a serving wireless communication unit, for processing beam-forming signals of antenna elements in an antenna array of a wireless cellular communication system. The network element, such as a serving wireless communication unit, comprises logic arranged to receive signals from a plurality of antenna elements. The network element, such as a serving wireless communication unit, further comprises a plurality of rake receivers arranged to receive the signals wherein a first set of received signals are received from 'first beam-forming' logic associated with a sector beam. The wireless communication unit further comprises a second set of received signals received from at least one 'second beam-forming' logic associated with creating a major portion of at least one sub-sector beam whose centre azimuth angle is located within the sector beam wherein the at least one sub-sector beam and the sector beam use the same carrier frequency. The wireless communication unit further comprises logic for separately processing signals output from the plurality of rake receivers associated with the sector beam and the at least one sub-sector beam.

According to a third aspect of the invention, there is provided a method for controlling antenna elements in an antenna array of a wireless cellular communication system that comprises a network element, such as a serving wireless communication unit, operably coupled to the antenna array for communicating with a remote wireless communication unit. The method comprises configuring a first radiating element of the antenna array to create a radiation pattern that comprises a sector beam; and configuring at least one second radiating element of the antenna array to create a major portion of at least one sub-sector beam within the sector beam wherein the at least one sub-sector beam and the sector beam use the same carrier frequency.

According to a fourth aspect of the invention, there is provided a computer program product comprises program code for controlling antenna elements in an antenna array of a wireless cellular communication system that comprises a network element, such as a serving wireless communication unit, operably coupled to the antenna array for communicating with a remote wireless communication unit. The computer program product comprising program code operable for: comprises configuring a first radiating element of the antenna array to create a radiation pattern that comprises a sector beam; and configuring at least one second radiating element of the antenna array to create a major portion of at least one sub-sector beam within the sector beam wherein the at least one sub-sector beam and the sector beam use the same carrier frequency.

According to a fifth aspect of the invention, there is provided a method for processing beam-forming signals of antenna elements in an antenna array of a wireless cellular communication system that comprises a network element, such as a serving wireless communication unit, operably coupled to the antenna array for communicating with a remote wireless communication unit. The method comprises receiving a first signal at least one first radiating element of a plurality of radiating elements of an antenna array arranged to create a radiation pattern that comprises a sector beam; receiving a second signal at an at least one second radiating element of the plurality of radiating elements arranged to create a radiation pattern that comprises creating a major portion of at least one sub-sector beam located within the sector beam wherein the at least one sub-sector beam and the sector beam use the same carrier frequency. The method further comprises applying signals received at the plurality of antenna elements to a plurality of rake receivers and separately processing signals output from the plurality of rake receivers associated with the sector beam and the at least one sub-sector beam by beam-forming logic.

According to a sixth aspect of the invention, there is provided a computer program product comprising program code for controlling antenna elements in an antenna array of a wireless cellular communication system that comprises a network element, such as a serving wireless communication unit, operably coupled to the antenna array for communicating with a remote wireless communication unit. The computer program product comprising program code is operable for: comprises receiving a first signal at least one first radiating element of a plurality of radiating elements of an antenna array arranged to create a radiation pattern that comprises a sector beam; receiving a second signal at an at least one second radiating element of the plurality of radiating elements arranged to create a radiation pattern that comprises creating a major portion of at least one sub-sector beam located within the sector beam wherein the at least one sub-sector beam and the sector beam use the same carrier frequency. The code is further operable for applying signals received at the plurality of antenna elements to a plurality of rake receivers and separately processing signals output from the plurality of rake receivers associated with the sector beam and the at least one sub-sector beam by beam-forming logic.

These and other aspects, features and advantages of the invention will be apparent from, and elucidated with reference to, the embodiments described hereinafter.

Figure 1:
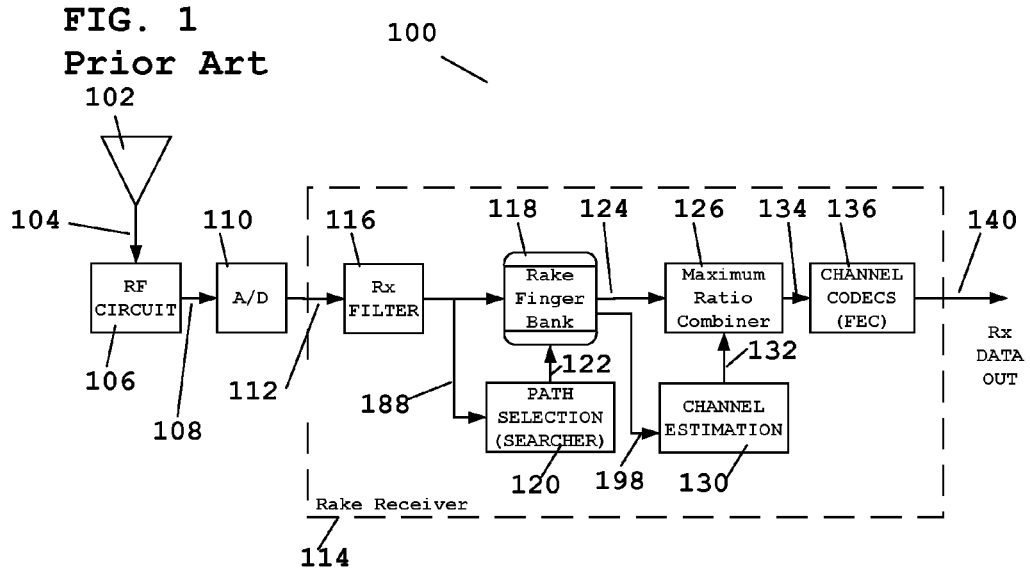
FIG. 1 illustrates a known code division multiple access (CDMA) receiver architecture.
Figure 2:
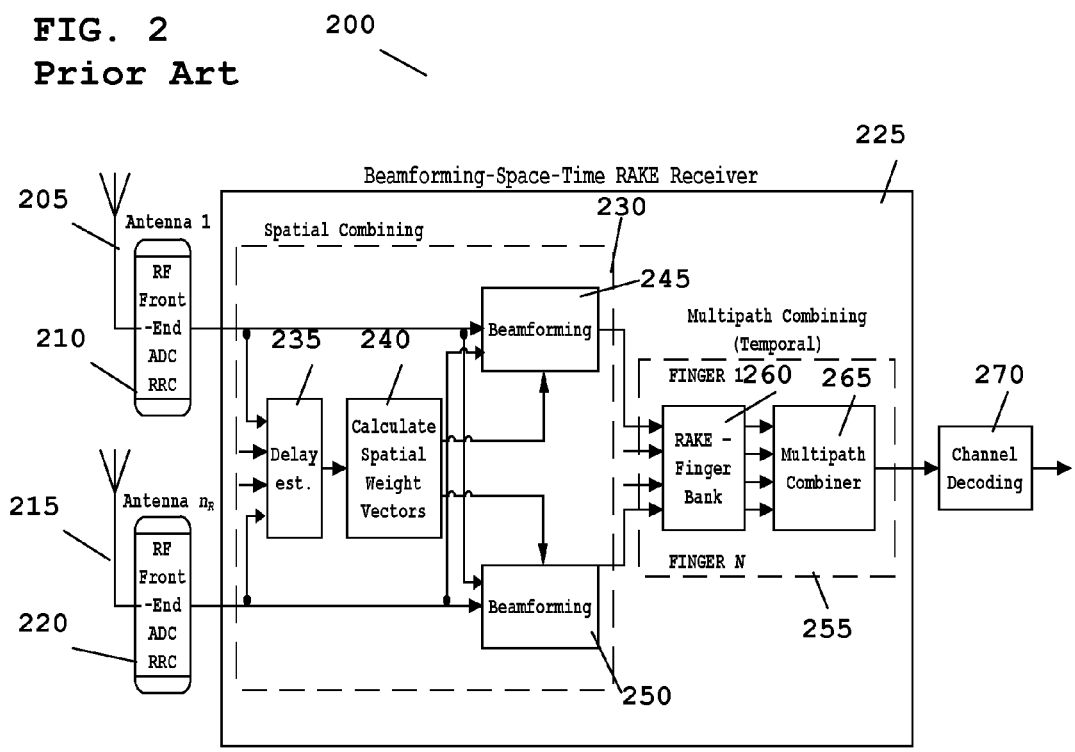
FIG. 2 illustrates a known non-diversified non-active beam-formed CDMA receiver, together with a typical cellular sectorisation scheme used in network planning.
Figure 2:
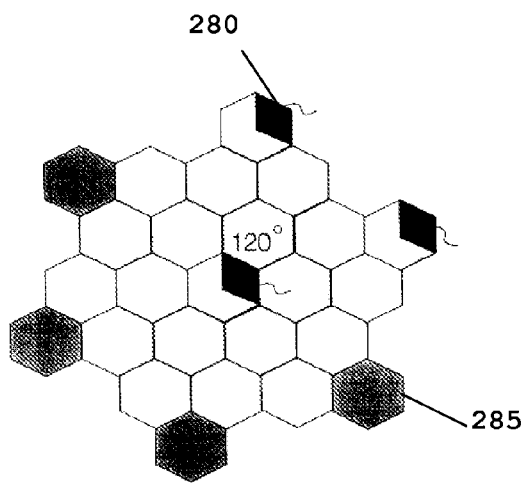
Figure 3:
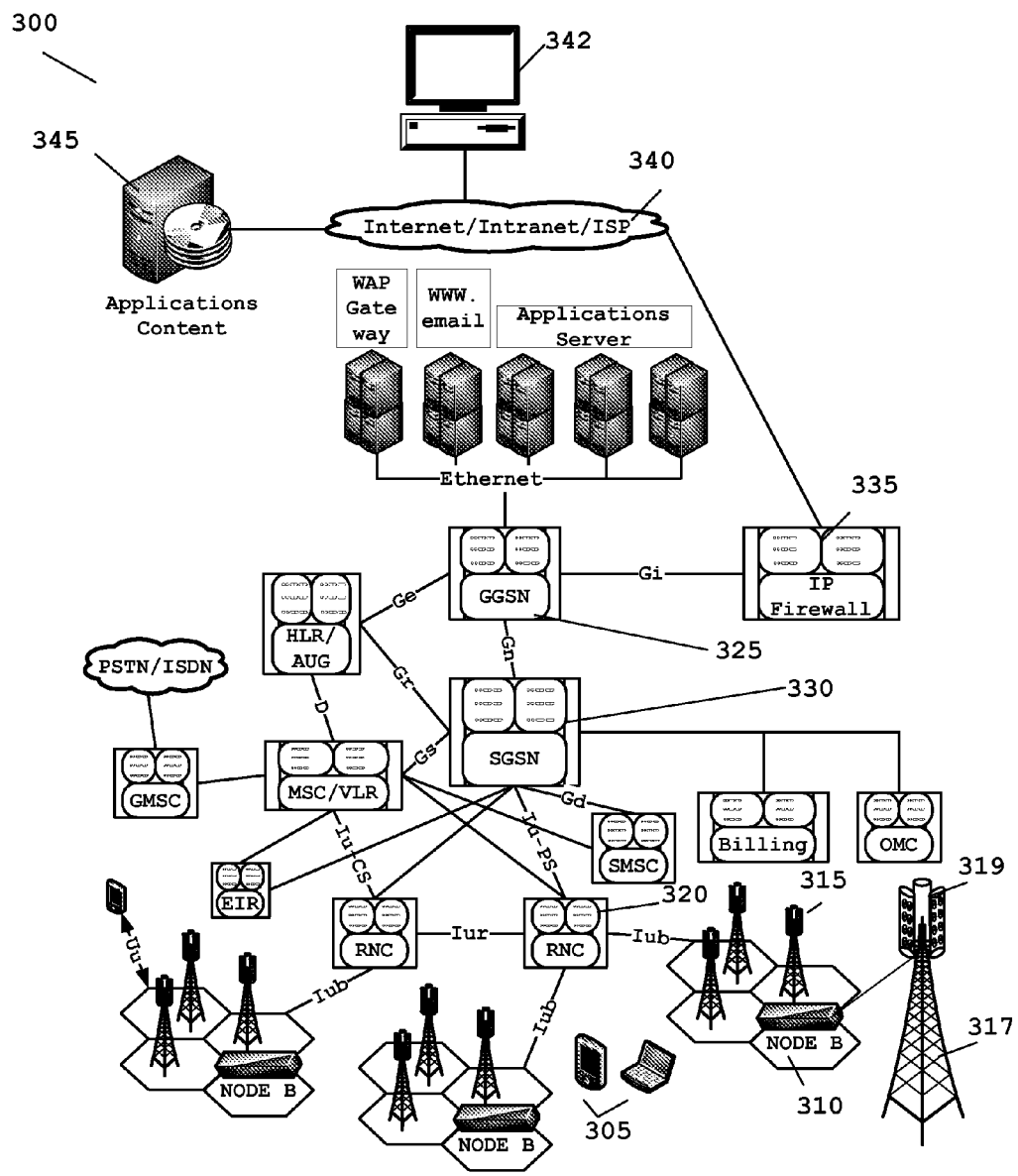

Embodiments of the invention will be described, by way of example only, with reference to the accompanying drawings, in which:

FIG. 3 illustrates a $3^{rd}$ generation (3G) wireless communication system architecture adapted in accordance with some embodiments of the invention.

Figure 4:
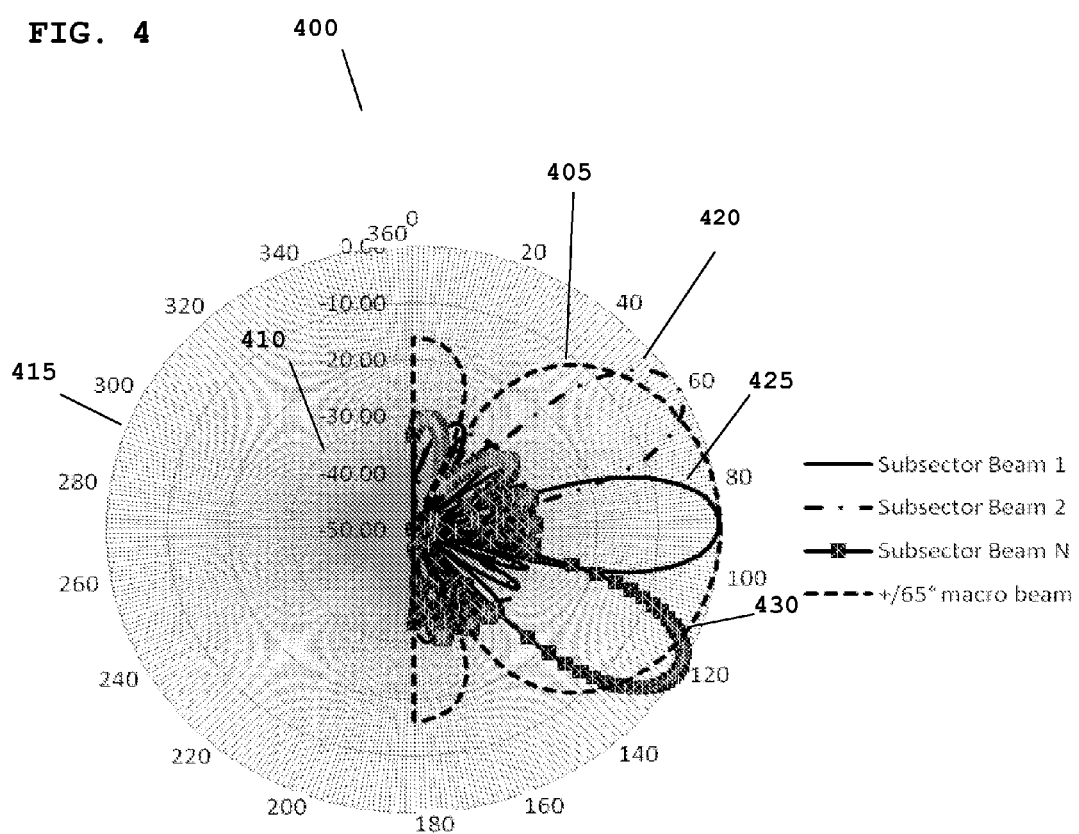

FIG. 4 illustrates azimuth patterns of beam formation using a sector beam and sub-sector beams in accordance with some embodiments of the invention.

Figure 5:
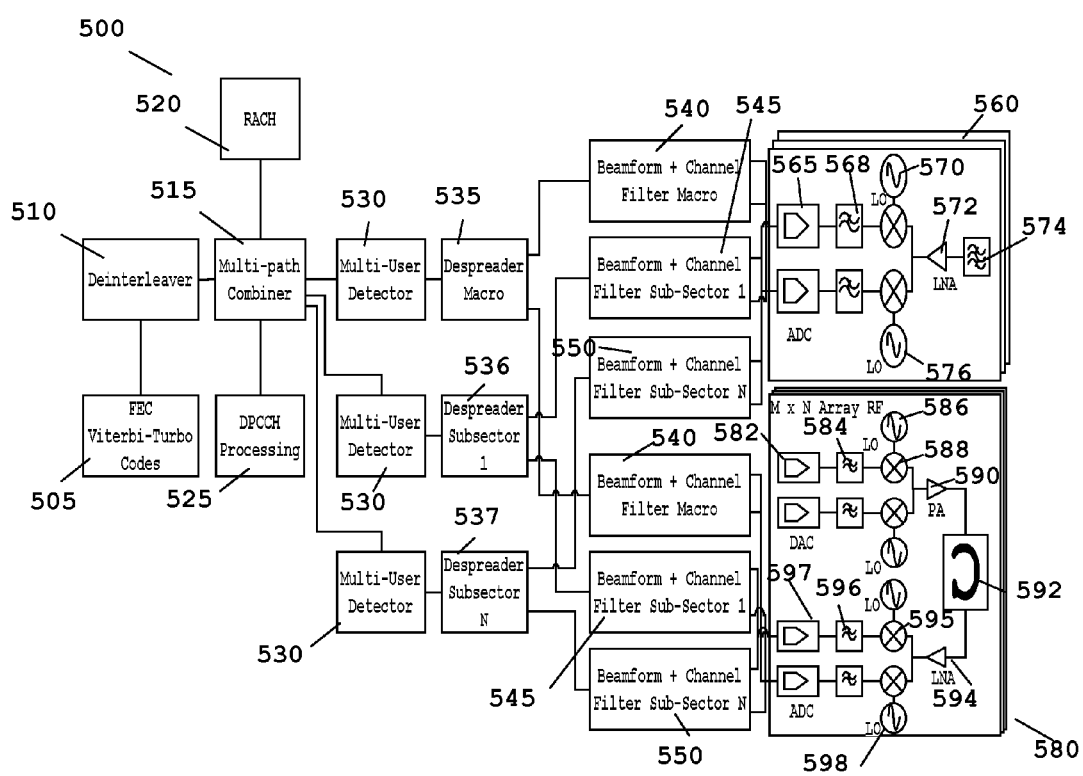

FIG. 5 illustrates a multi-user detector based CDMA receive architecture adapted in accordance with some embodiments of the invention.

Figure 6:
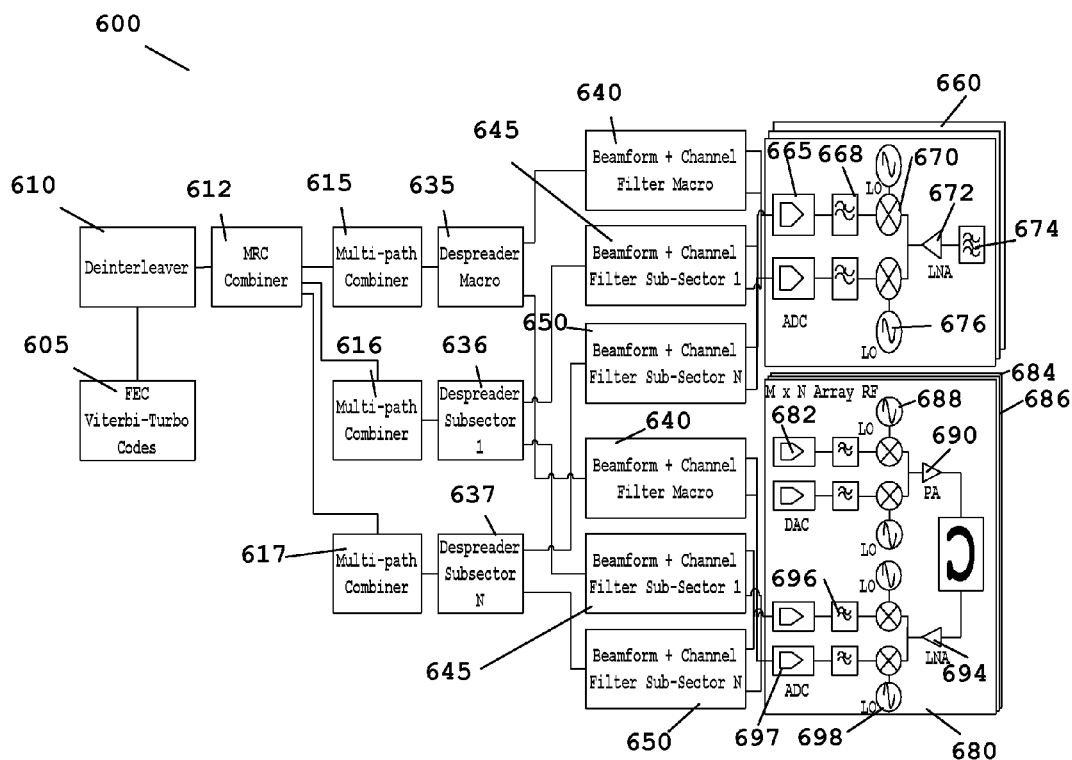

FIG. 6 illustrates a multi-path combining based CDMA receive architecture adapted in accordance with some embodiments of the invention.

Figure 7:
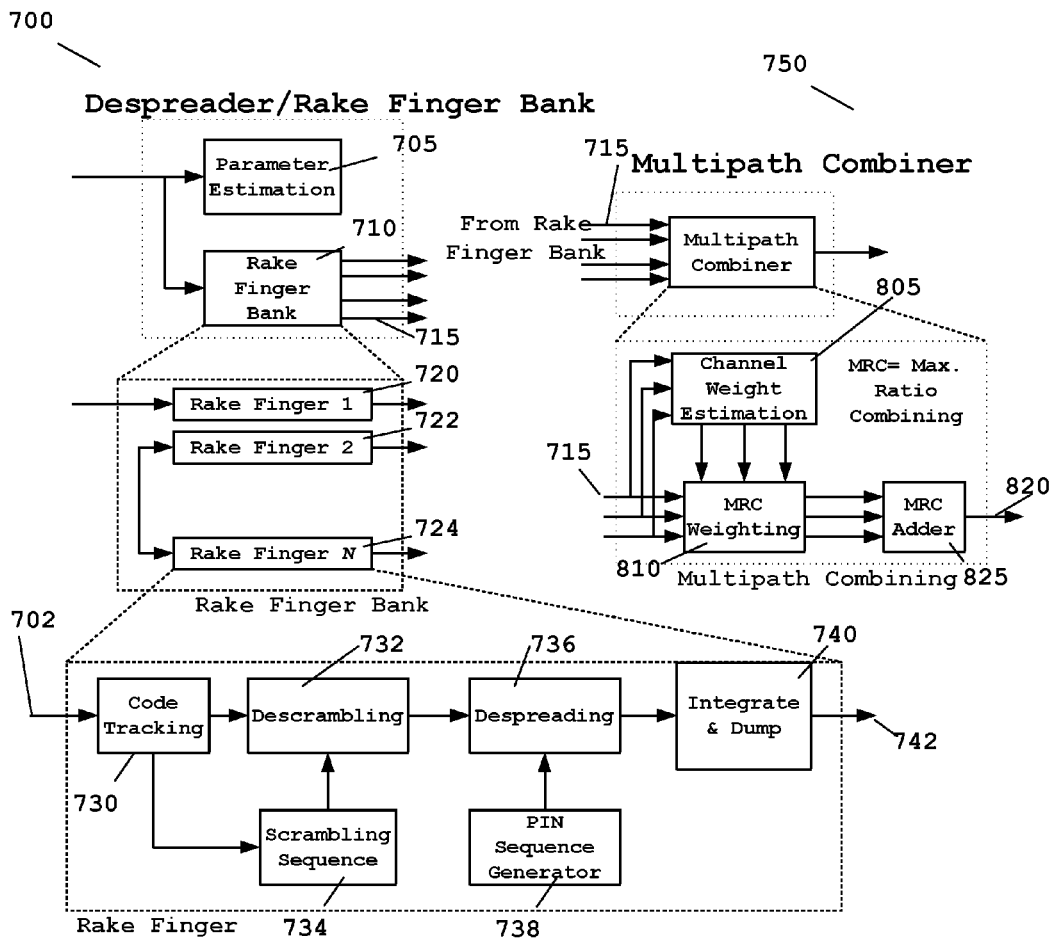

FIG. 7 illustrates a method of de-spreader rake receiver multi-path combiner description in a cellular system in accordance with some embodiments of the invention.

Figure 8:
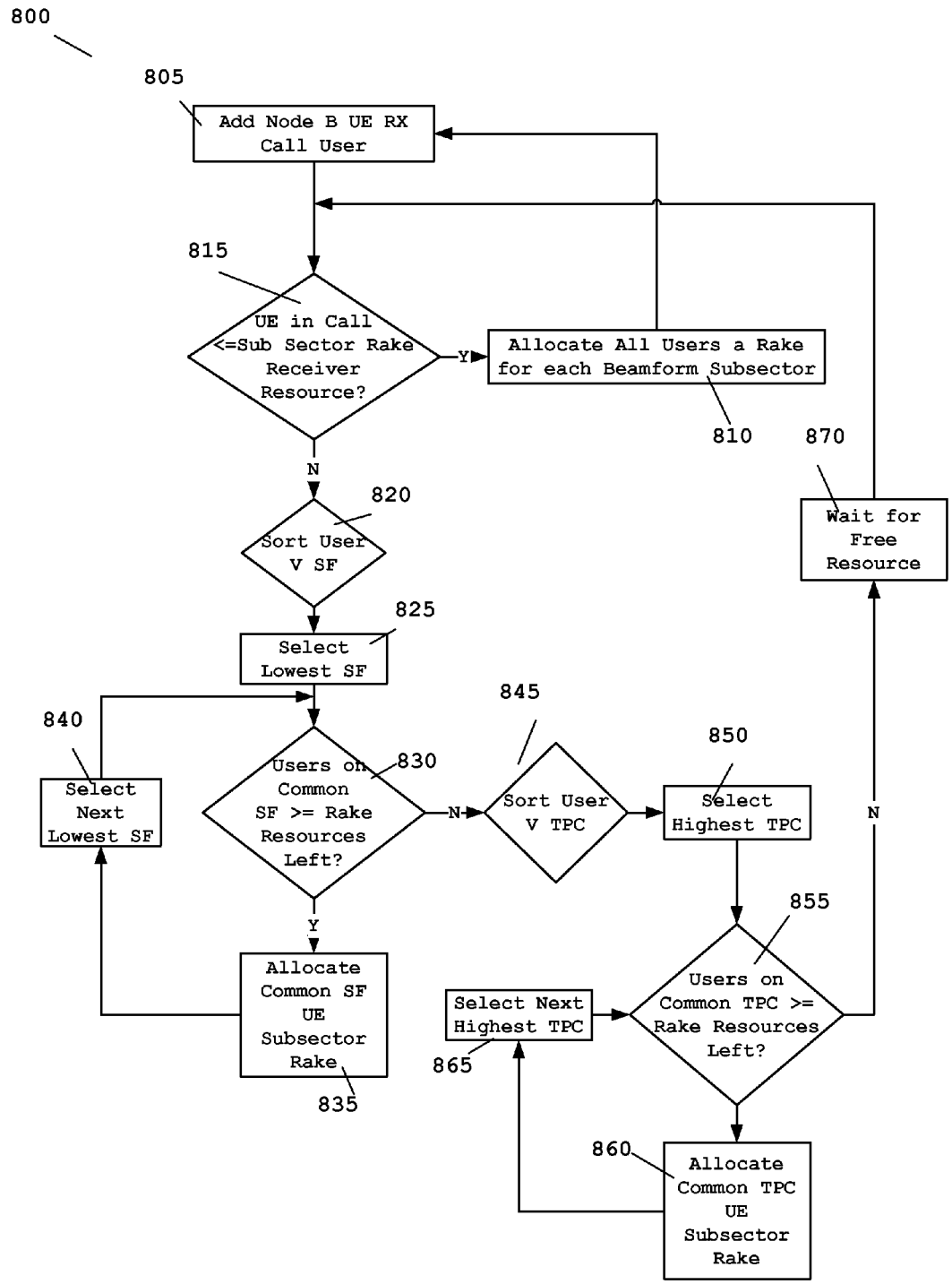

FIG. 8 illustrates a flowchart for allocation of rake receiver resource that may be employed to implement signal processing functionality in embodiments of the invention.

Figure 9:
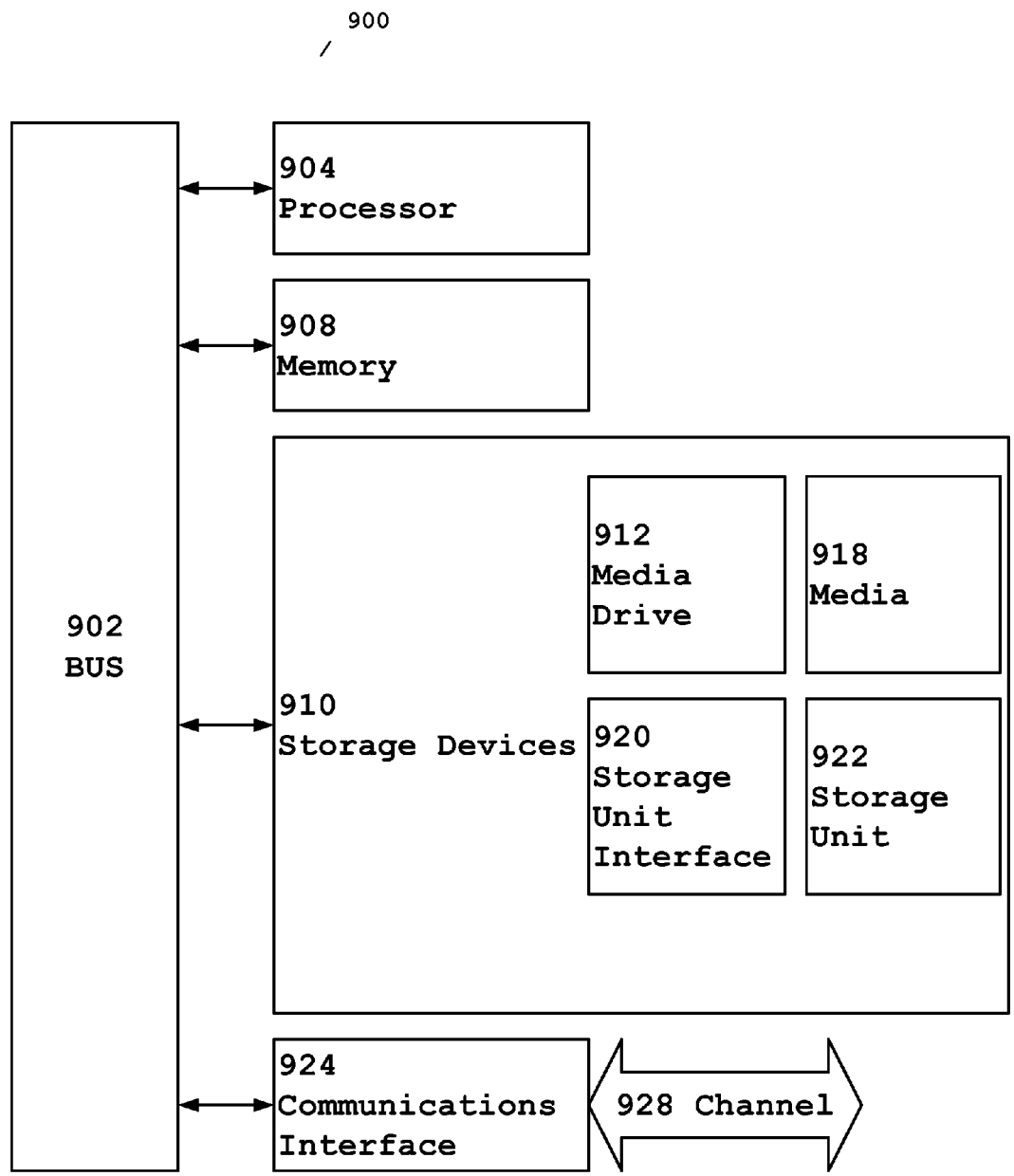

FIG. 9 illustrates a typical computing system that may be employed to implement signal processing functionality in embodiments of the invention.

DETAILED DESCRIPTION OF EMBODIMENTS OF THE INVENTION

An antenna array element is a radiative structure whose purpose is to convert electro-magnetic (EM) signals to electrical signals, or vice versa, in which a singular element has a fixed radiation pattern. The term 'radiative elements' described herein refers to elements capable of radiating an electromagnetic signal. Furthermore, the term 'radiative elements' described herein also encompass structures capable of absorbing EM radiation and converting to electrical signals. These elements, constructed as an array can be configured to have various radiation patterns by manipulation of electrical signals coupled to the elements. Thus, the ability to alter the radiative beam shape may be achieved. In accordance with embodiments of the invention, the signal from each receiver can be operably coupled to a plurality of beam former logic modules, thereby allowing multiple received radiative patterns to be processed. In the field of radio-array active antenna technology, receive signals are additively combined coherently from the different receiver (Rx) elements. This receive combining may be implemented in the digital domain. For optimal coherency to exist on the separate signals at the combining stage the latency, phase response and gain response of the respective receive paths needs to be equalized. Different receivers in an array may exhibit variations in these characteristics due to, say, component manufacturing tolerances, clock skew, temperature and power supply variations, etc. For example, in practical systems, there will be different instantiations of voltage regulators, and therefore the different devices exhibit process induced offsets and temperature-dependent coefficients. Similarly, the clock distribution to multiple transceivers undergoes variations in the clock path, thereby causing an offset in relative phase to each transceiver. It is also known that temperature profiles within the antenna array housing may be significant.

Furthermore, each of the transceivers will not have the same proximity to heat generating components, such as the digital signal processing chain. Likewise certain transceivers will be at a periphery of the array, and therefore experience more variation due to the ambient environment. In addition, some transceivers will have different transmit power profiles, according to the beam-form coefficients, and as a result exhibit different thermal generation profiles.

In contrast to known antenna array and beam-forming architectures, where only one beam (transmit or receive) is processed, embodiments of the invention utilise a plurality of processed beams. Thus, particularly in utilising a sector-beam together with at least one sub-sector beam located within the sector beam, the prior art susceptibility to quickly changing multi-path signals is alleviated.

In the context of embodiments of the invention, the term 'beam' is meant to encompass a profile of antenna radiation pattern contoured in both elevation and horizontal azimuth angular planes of equal EM radiation signal strength.

Embodiments of the invention utilise the scenario that UE devices transmitting path to a Node B are generally angularly dispersed within a sector supported by an antenna array beam-form. Thus, embodiments of the invention utilise the primary sector beam and one or more additional narrower sub-sector beam patterns to provide an improvement of signal-to-interference ratio (SIR) performance. Consequently, an improvement of signal-to-noise plus interference per bit (Eb/No) per UE uplink can be obtained. Advantageously, UEs in the spatial region outside the primary and additional narrower beams would be suppressed, thereby limiting their impact as interferers to UEs transmitting within the beam pattern.

In particular, embodiments of the invention employ active array antenna technology utilising multiple receive beam-forming paths, such that Eb/No of a particular user UE can benefit from spatial filtering of multiple receive paths. In one embodiment of the invention, this aspect may be achieved with a combination of sector receiver and one or more selective (sub-sector) rake receivers linked to the power control algorithm on the uplink communication channel. Furthermore, in one embodiment of the invention, the signals of a subset of UEs is arranged be processed within the one or more sub-sector beams, thus negating a need to increase substantially the signal processing requirements of the cell.

The following description focuses on embodiments of the invention applicable to a UMTS (Universal Mobile Telecommunication System) cellular communication system and in particular to a UMTS Terrestrial Radio Access Network (UTRAN) of a $3^{rd}$ generation partnership project (3GPP™) system. However, it will be appreciated that the invention is not limited to this particular cellular communication system, but may be applied to any other cellular communication system that is capable of utilizing antenna arrays. Furthermore, some embodiments of the invention, may be applied to any code division multiple access (CDMA) system, such as used in the satellite-based global positioning system (GPS). For example, the wireless communication system may comprise a wireless serving communication unit within the Earth's atmosphere and the remote wireless communication unit communicating with the wireless serving communication unit may comprise a geo-stationary or orbiting satellite.

In some example embodiments, the generation of the main sector beam and a number of the sub-sector beams that are located within a portion of the main sector beam may be advantageously configured to use the same technology standard, e.g. 3GPP™, UMTS™, etc.

Furthermore, in some example embodiments, it is envisaged that the main sector beam and a number of the sub-sector beams that are located within a portion of the main sector beam may be advantageously configured to use the same carrier frequency. In some example embodiments, it is envisaged that the use of the same carrier frequency by both the main sector beam and a number of the sub-sector beams may be performed concurrently.

The following description focuses on embodiments of the invention applicable to a receiver operation of an active antenna array, associated circuitry and, in some embodiments the receiver operation of the Node B. However, it is envisaged that the embodiments of the invention herein described are equally applicable to a transmitter operation of an active antenna array.

Referring now to FIG. 3, a cellular-based communication system 300 is shown in outline, in accordance with one embodiment of the present invention. In this embodiment, the cellular-based communication system 300 is compliant with, and contains network elements capable of operating over, an universal mobile telecommunication system (UMTS™) air-interface. In particular, the embodiment relates to the Third Generation Partnership Project (3GPP™) specification for wide-band code-division multiple access (WCDMA) standard relating to the UTRAN radio Interface (described in the 3GPP™ TS 25.xxx series of specifications).

A plurality of wireless subscriber communication units/terminals (or user equipment (UE) in UMTS™ nomenclature) 305 communicate over radio links with a plurality of base transceiver stations, referred to under UMTS terminology as Node-Bs, 315 supporting communication coverage over a particular communication cell 310. The system 300 comprises many other UEs and Node-Bs, which for clarity purposes are not shown.

The wireless communication system, sometimes referred to as a Network Operator's Network Domain, is connected to an external network 340, for example the Internet. The Network Operator's Network Domain includes:

(i) A core network, namely at least one Gateway General Packet Radio System (GPRS) Support Node (GGSN) 325 and at least one Serving GPRS Support Nodes (SGSN) 330; and (ii) An access network, comprising a UMTS Radio network controller (RNC) 320; and at least one UMTS Node-B 315, where each RNC 320 may control one or more Node-Bs 315.

The GGSN 325 or SGSN 330 is responsible for UMTS™ interfacing with a Public network, for example a Public Switched Data Network (PSDN) (such as the Internet) 340 or a Public Switched Telephone Network (PSTN). The SGSN 330 performs a routing and tunnelling function for traffic, whilst a GGSN 325 links to external packet networks. Each SGSN 330 provides a gateway to the external network 340. The Operations and Management Centre (OMC) is operably connected to RNCs 320 and Node-Bs 315. The OMC comprises processing functions and logic functionality in order to administer and manage sections of the cellular communication system 300, as is understood by those skilled in the art.

The Node-Bs 315 are connected to external networks, through Radio Network Controller (RNC) stations, including RNC 320 and mobile switching centres (MSCs), such as SGSN 330. A cellular communication system will typically have a large number of such infrastructure elements where, for clarity purposes, only a limited number are shown in FIG. 3.

Each Node-B 315 contains one or more transceiver units and communicates with the rest of the cell-based system infrastructure via an $I_{ub}$ interface, as defined in the UMTS™ specification. Each Node B 315 is operably coupled to an antenna mast 317 for transmitting and receiving signals to/from remote UEs, where each antenna mast 317 comprises an antenna array 319 adapted in accordance with embodiments of the invention.

In accordance with embodiments of the invention, active array technology is employed in the cellular communication system 300. In particular, multiple receive patterns are formed as illustrated in the example of FIG. 4, and processed to exploit the spatial filtering effect of the beam-forming process, as illustrated in the example arrangements of FIG. 5 and FIG. 6.

In particular, embodiments of the invention propose a (W)CDMA receiver architecture capable of maximising link performance, with the added benefit of negating the need to always increase UE uplink power control accordingly.

Furthermore, in the Node B Rx, in one example embodiment, several copies of the individual received signals are arranged to be combined with different beam-form weights, thereby forming multiple uplink beam patterns. In the CDMA communication system described above, these sub-sector beam-forms are processed so as to improve link performance.

Referring now to FIG. 4, a series of azimuth patterns of beam formation 400, using a sector beam and sub-sector beams in accordance with some embodiments of the invention, is illustrated. Azimuth plots for antenna(e) plot contours 410, 415 of common electromagnetic (EM) field strength versus angular position, as transmitted from the antenna(e). Conversely, for the antenna(e) in receive mode of operation, the azimuth plot is a contour plot of equal attenuation level, as measured at the beam-form output from an omnidirectional electromagnetic (EM) source that is a fixed distance from the antenna(e) versus the electromagnetic (EM) field source's angular position.

Both transmit and receive azimuth plots are provided for a frequency range. The series of azimuth patterns of beam formation 400 illustrate different coverage areas 410, 415, and therefore received power levels where received signals can be detected and recovered. The series of azimuth patterns of beam formation 400 comprise a +/−65° sector beam 405 created in substantially the traditional manner. However, in accordance with some embodiments of the invention, one or more additional sub-sector beams, such as sub-sector beam 1 420, sub-sector beam 2 425, sub-sector beam N 430, are created substantially within the +/−65° sector beam 405. In one embodiment, each sub-sector beam 420, 425, 430 is processed in much the same way as the sector beam 405. For example, one configuration for processing the sub-sector beams 420, 425, 430 is detailed in FIG. 5, for a WCDMA example with polarised diversity.

The cost in implementing the embodiments of the invention is the requirement to use more RAKE receivers than are traditionally used in Node Bs. However, as RAKE receivers are typically implemented in software, firmware or reconfigurable hardware, such as field programmable gate array (FPGA) devices, the increase in the number of RAKE receivers can be readily accommodated with the increase in signal processing power of recent digital signal processors (DSPs). Typical Node B equipment can process ninety six UE calls. Thus, a typical Node B operating in a conventional prior art manner would require 386 RAKE receivers.

In order to implement embodiments of the invention, for example using four sub-sectors (narrow beam antenna patterns) within a sector beam, as well as the sector beam antenna pattern itself, a total number of required RAKE receivers is:

96 UEs×5 beams(e.g. 4 sub-sectors+1 sector beam)×2 (polarised diversity signals)×2(2 polarised diversity signals for DPCCH and DPDCH channels per user)+2 additional RAKE receivers for RACH reception=1922 RAKE receivers.

Transmit signal processing in the Node B comprises of channel processing the information pertaining to DPCCH and DPDCH. DPDCH data is spread with both a Pn Code and orthogonal spreading factor code, which is applied on a per user basis. Transmit signals are furthermore channel filtered, beam-formed converted to analogue signals, analogue filtered, up-converted to an RF frequency and amplified.

In this regard, the Dedicated Physical Control Channel (DPCCH) is used to transmit pilot symbols for coherent reception, power signalling bits, and rate information for rate detection. This is simultaneously transmitted with the user data that is transmitted on the Dedicated Physical Data Channel (DPDCH), as is much of the control information.

Employing embodiments of the invention has the effect of spatially filtering transmitting UEs from in the sub-sector beam of that cell sector. The ability to use the sector beam and one or more sub-sector beams is, thus, robust to quickly changing multi-paths in a cellular communication system.

In some example embodiments, it is also envisaged that the main sector beam and a number of the sub-sector beams that are located within a portion of the main sector beam may be advantageously configured for use with the same on-going call, and thus in combination contribute to the call processing link improvements. Thus, in some example embodiments, the processing of signals from a subsector beam and from a sector beam may be performed concurrently for the same call. Thus, and consequently in some example embodiments, using the same air interface standard may allow for optimum results for signals coming from a variety of multipath propagation conditions from the UE to the Node-B. A scatter-less propagation uplink may be deemed best suited to sub-sector beam processing, whereas a widely scattered multipath propagation condition may be deemed best suited to sector beam processing. Uplink propagation conditions can vary over the duration of a call processed by a single Node-B. Therefore, even in instances where best performance is obtained through sub-sector beam processing, both paths are concurrently processed to address the issue of changing propagation conditions, including quickly changing multi-paths or any change in scattering profile.

In one embodiment of the invention, all UEs are configured to be capable of being processed in the sector beam. However, in accordance with embodiments of the invention, selective UEs may be placed in the sub-sector beam-form paths. FIG. 8 details an algorithmic approach to selecting UEs for processing on the sub-sector beam form paths. All UEs will be processed until the RAKE resource limit has been reached. At that point users on the lowest uplink spreading factor (SF) will be allocated extra processing resources, since they will require the highest CINR. If some resources are still available at this point, then in some embodiments of the invention it is proposed that allocation is based on proximity to the cell boundary, for example as indicated by uplink power control parameters. In embodiments of the invention, these sub-sector paths may be prioritised based on data throughput requirements or users located on a cell boundary.

WCDMA networks utilize closed loop power control on the uplink. As such the power control parameters are controlled by the Node B. Transmit Power control (TPC) bits are sent to the UE device for this purpose. Therefore, embodiments of the invention propose using the accumulated status of these bits to provide an estimate for uplink channels that are approaching the limits of the cell coverage range. Thus, on this basis, uplink priority to sub-sector beam processing can be accommodated.

In one embodiment of the invention, it is proposed that the major portion of at least one sub-sector beam that is located within the sector beam comprises at least 80% geographic coverage of the at least one sub-sector beam, where the beam profiles of the sector and sub-sector refer to the same attenuation level on the uplink and the same field strength in the case of a downlink. In this manner, a minor portion of the at least one sub-sector beam may be arranged to fall outside of the sector beam, in order to focus on supporting communications with UEs located substantially on a periphery of the sector beam. It is envisaged that in other embodiments a larger or smaller portion of the at least one sub-sector beam may be located within the sector beam. For the remainder of the description, it is envisaged that the term 'major portion' with respect to the beam-width of the at least one sub-sector beam that is located within the sector beam may comprise anywhere between 51-99% of the sector beam.

In one embodiment of the invention, it is proposed that the plurality of radiating antenna elements comprise a co-located fulcrum of beam creation. In this manner, substantially the same radiating elements are used in the creation of both the sector beam and sub-sector beam.

In one embodiment of the invention, it is proposed that the at least one sub-sector beam may be created such that it has a narrower horizontal or vertical azimuth angular radiation pattern than the created sector beam.

In one embodiment of the invention, it is proposed that the sector beam-forming process and/or sub-sector beam-forming process may employ virtual antenna generation. Virtual antenna generation uses information from two or more antenna elements to generate a further (virtual) antenna element signal. Extrapolation logic may then be employed to use difference functions and phase rotational functions in order to generate the effects of such virtual antenna elements. Consequently, the degrees of freedom in the beam-former are advantageously increased. In this manner, higher attenuation of undesired signals may be achieved. Alternatively or additionally, much narrower beams may be generated without the use of real signal processing paths and associated real antenna elements.

Referring now to FIG. 5, a multi-user detector (MUD) based CDMA Receiver architecture is illustrated as adapted in accordance with some embodiments of the invention. In WCDMA networks, embodiments of the invention employ such multiple sub-sector beam-forms, which can be processed and combined so as to improve link performance.

In an embodiment of the invention, polarised diversity receive paths are utilised. However, it is envisaged that the inventive concept may be applied in scenarios where a polarised diversity path is not available.

The multi-element combining based WCDMA receiver architecture 500 is first described in a receive mode of operation. The multi-path combining based WCDMA receiver architecture 500 may comprise a receiver of a serving wireless communication unit, such as a Node B or other wireless base station. Alternatively, the multi-path combining based WCDMA receiver architecture 500 may comprise a receiver of a network element that may couple a serving wireless communication unit to an antenna array. Herein after, the term network element may encompass both a serving wireless communication unit, as well as an architectural element located between the serving wireless communication unit and the antenna array.

The multi-path combining based WCDMA receiver architecture 500 may comprise a receiver comprises a plurality of parallel transceiver circuits operably coupled to an active antenna array, of whose receiver elements are arranged to individually provide down-converted digitised samples corresponding to the receive channel in question for the received signals. As will be appreciated by a skilled artisan, the transmit section is also operably connected to the antenna array, and the reverse (transmit) operation of its beam-forming section is not described in 500 for the purpose of simplicity.

In transmit operation, the beam-formed paths cannot be isolated as the over air medium is the same; whereas for a receive operation, the receive copies of the receive signals can be generated without altering the other paths that are processed.

The plurality of parallel transceiver circuits comprise, in a receive mode, an antenna duplexer 592 providing a received signal to a low-noise amplifier (LNA) 594.

The LNA 594 provides amplified versions of the received signals to respective quadrature and 'Q') down-conversion stages arranged to down-convert the respective amplified received signals based to a frequency down-conversion signal. Down conversion signals are fed in quadrature format from a local oscillator generation sub-system 598. The respective quadrature down-converted amplified received signals are input to respective low-pass filters 596 and thereafter to respective analogue-to-digital converters 597 to transform the quadrature down-converted received signal to a digital form.

In accordance with embodiments of the invention, the digital form of the various received signals is input to a plurality of parallel beam-form processing logic modules 540, 545, 550. Beam-forming processing involves application of phase and amplitude scaling of each individual receive signal that corresponds to a beam pattern co-efficient.

Each beam form path would be separately processed by a rake receiver bank. Each of the plurality of parallel beam-form processing logic modules comprise respective logic arranged to process beam-forming and channel filtering of the sector beam 540, beam-forming and channel filtering of a first sub-sector 545, up to beam-forming and channel filtering of the $N^{th}$ sub-sector 550.

In an embodiment of the invention in conjunction with DPDCH rake receiver processing, it is envisaged that separate dedicated RAKE receivers may be allocated post beam-forming functionality in order to process a DPCCH and process a random access channel (RACH).

The parallel beam-form processing logic modules 540, 545, 550 process the received digital form of the signal using respective channel filters and provide output signals to a plurality of parallel respective de-spreader logic modules arranged to de-spread the received digital signal per beam, e.g. sector beam de-spreader logic 535, sub-sector 1 de-spreader logic 536 up to sub-sector N de-spreader logic 537. Each beam de-spreader logic 535, 536, 537 provide outputs to respective multi-user detector (MUD) logic modules 530, 531, 532. The MUD logic modules 530, 531, 532 functionality aims to reduce the interference from other users sharing the same frequency. MUD processing is optional in WCDMA depending on which release of the standard is considered. In this embodiment, the outputs from the MUD detector logic modules 530, 531, 532 are input to multi-path combining logic 515. In one embodiment of the invention, separate dedicated receive paths are also allocated to processing a dedicated physical control channel (DPCCH) and processing a random access channel (RACH). Thus, the DPCCH may be used by the MRC logic to derive signal paths for combining with an optimum signal to interference plus noise.

In one embodiment of the invention, random access channel (RACH) decodes are needed to register the UE in camp mode on the network or the need to access for location update or as part of a start of call scheduling. In one embodiment of the invention, RACH resources are dedicated to the sector beam only. Furthermore, in one embodiment of the invention, DPDCH and DPCCH processing are performed in all RAKE receiver paths.

Thus, a composite signal is generated in multi-path combiner logic 515 and provided to de-interleaver logic 510 arranged to de-interleave the interleaved received signal and thereafter the de-interleaved composite signal is input to a forward error correction (FEC) viterbi decoder logic 505 to decode the de-interleaved composite signal.

In one embodiment of the invention, the DPCCH channel pilot information on each path is used to determine the weighting used by the maximal-ratio combining (MRC) logic on each combined path. MRC is a method of combining in which
 (a) the signals from each channel are added together,
 (b) the gain of each channel is made proportional to the root mean square (rms) signal level and inversely proportional to the mean square noise level in that channel, and
 (c) different proportionality constants are used for each channel.

In one example embodiment, the Modem air interface protocols, such as WCDMA, allow multiple UEs to simultaneously transmit to the base-station on the uplink on a single carrier frequency. A minimal limit of signal to noise per bit (Eb/No) ratio is required on the uplink channel to ensure adequate bit error rate (BER). This implies that the higher the data rate for a particular UE at least a proportionally better Carrier to interference plus noise ratio (CINR) is required to maintain Eb/No.

Referring now to FIG. 6, an example embodiment of the invention illustrates a multi-path combining based CDMA receive architecture 600, adapted in accordance with an alternative embodiment of the invention. The multi-path combining based CDMA transceiver architecture 600 is first described in a receive mode of operation. The multi-path combining based CDMA transceiver architecture 600 comprises a plurality of parallel transceiver circuits operably coupled to an active antenna array. In a receive mode of operation, an array of parallel receivers provide down-converted digitised samples corresponding to the receive channel in question for the received signals.

The plurality of parallel transceiver circuits comprise, in a receive mode, an antenna duplexer 692 providing a received signal to a low-noise amplifier (LNA) 694. The LNA 694 provides amplified versions of the received signals to respective quadrature ('I' and 'Q') down-conversion stages arranged to down-convert the respective amplified received signals based on a frequency down-conversion signal. Down conversion signals are fed in quadrature format from a local oscillator generation sub-system 698. The respective quadrature down-converted amplified received signals are input to respective low-pass filters 696 and thereafter to respective analogue-to-digital converters 697 to transform the quadrature down-converted received signal to a digital form.

In accordance with embodiments of the invention, the digital form of the various received signals is input to a plurality of parallel beam-form processing logic modules 640, 645, 650. Beam-forming processing involves application of phase and amplitude scaling of each individual receive signal that corresponds to a beam pattern coefficients.

Each beam form path would be separately processed by a rake receiver bank. Each of the plurality of parallel beamform processing logic modules comprise respective logic arranged to process beam-forming and channel filtering of the sector beam 640, beam-forming and channel filtering of a first sub-sector 645, up to beam-forming and channel filtering of the $N^{th}$ sub-sector 650. The parallel beam-form processing logic modules 640, 645, 650 process the received digital form of the signal using respective channel filters and provide output signals to a plurality of parallel respective de-spreader logic modules arranged to de-spread the received digital signal per beam, e.g. sector beam de-spreader logic 635, sub-sector 1 de-spreader logic 636 up to sub-sector N de-spreader logic 637. Each beam de-spreader logic 635, 636, 637 provide outputs to respective multi-path combiner logic modules 615, 616, 617. In this case multi-path combining can be performed for each individual path. Each of the multi-path combiner logic modules 615, 616, 617 output a plurality of data streams corresponding to each UE uplink into maximum ratio combining (MRC) logic 612 that is arranged in one embodiment to use a channel estimator to obtain an MRC weighting for each antenna array element. Maximal-ratio combining (MRC) is a method of diversity combining, in which:
 (a) The signals from each channel are added together;
 (b) The gain of each channel is made proportional to the root mean square (rms) signal level, and inversely proportional to the mean square noise level in that particular channel; and
 (c) Different proportionality constants are used for each channel. Proportionality constants are generally equal in WCDMA implementations. Such proportionality constants are to be used if one path addition to the combined signal is proportionally gained or attenuated over other paths.

Thus, a composite signal is generated in MRC logic 612 and provided to de-interleaver logic 610 arranged to de-interleave the interleaved received signal and thereafter the de-interleaved composite signal is input to a forward error correction (FEC) viterbi decoder logic 605 to decode the de-interleaved composite signal.

In one embodiment of the invention, the DPCCH channel pilot information on each path is used to determine the weighting used by the MRC on each combined path.

In one embodiment of the invention, applicable to the architecture of FIG. 5 or FIG. 6, all receivers on both polarisation paths is arranged to process the cell sector beam-form, which would typically be +/−65° beam pattern. All UEs in the sector therefore have the capability of being received by this beam pattern. This is a conventional pattern used by sectors when cell planning cellular networks. In accordance with embodiments of the invention, the same digital signals are used from the different beam patterns of the plurality of ADCs. These beam patterns comprise the sector beam-form and at least one narrower beam pattern. If a sub-sector beam pattern was +/−17° a pattern, this would imply that approximately 25% of the sector may be covered with this sub-sector beam.

If each of the UEs angle of arrival is equally spatially distributed in the sector then 75% of UEs would be significantly attenuated. For example, if the beam was centred on −48°, with a +/−17° azimuth, then an incident signal whose angle of arrival is +20° would be substantially attenuated. Both of these signals would be processed simultaneously in the sector beam. However, spatial selection will ensure that some of these signals are attenuated. This could correspond to up to 6 dB improvement in Eb/No for UEs in that sector compared to a conventional receiver.

FIG. 7 illustrates a functional block diagram of an example de-spreader rake receiver 700 and an example multi-path combiner 750, each adapted in accordance with some embodiments of the invention.

The example de-spreader rake receiver 700 comprises parameter estimation logic 705 and a RAKE finger bank 710 arranged to receive beam-form and channel filter signals 702, as described with reference to FIG. 5 and FIG. 6. The parameter estimation logic 705, among other parameters, detects and provides correction factors for impairments in the received signal, where such impairments may include frequency offsets due to doppler or frequency error in UE equipment. The RAKE finger bank 710 comprises a plurality of parallel RAKE fingers 720, 722, 724. Multiple RAKE fingers within the RAKE finger bank 710 are arranged to track a single code to form a rake receiver for that code.

Thus, peak correlation of a code is identified on the RAKE fingers. Subsequent MRC addition of correlative peaks on the delayed finger paths is performed. Co-received signals are multiplied by the scrambling code and delayed versions of the scrambling code. The delays are determined by code tracker logic 730, prior to descrambling. Each delay corresponds to a separate multi-path signal that will eventually be combined. De-scrambling and de-spreading are performed before the combining operation in order to convert chip-level signals into symbol-level signals. The de-spreading logic module 736 receives a Pn Code sequence from pseudo-sequence generator 738, of which it is multiplied by the de-scrambled data. The output from de-spreading logic module 736 is applied to an integrate & dump logic module 740. De-spread data is then integrated over one symbol period, thereby providing one complex sample output per symbol. This process is carried out for all the paths that are to be combined. The output 742 of this process provides an input signal to the MRC.

FIG. 8 illustrates a flowchart 800 for allocation of rake receiver resource that may be employed to implement signal processing functionality in embodiments of the invention. The flowchart 800 describes a mechanism for a WCDMA system whereby all UEs can be processed by the sector beam-formed rake receiver and the sub-sector beam-formed paths are arranged to have less rake receivers than the sector beam-formed path. The flowchart 800 illustrates a means of efficiently allocating specific UEs to sub-sector beam paths.

As UE receive call UEs are loaded onto the Node-B, in step 805, the Node-B is able allocate rake receiver resources on all of the beam-form paths in step 810 up to a point where no further resources remain on the beam-formed paths, as determined in step 815.

When the amount of UEs exceeds the rake receiver budget for the beam-form paths in step 815, UEs are selected based on the spreading factor being used, as shown in step 820. For example, the lowest spreading factors are first allocated priority in step 825 as these require the best signal to noise ratio. The algorithm then determines, in step 830, whether the number of UEs employing a common spreading factor is greater than or equal to the number of rake receivers left for use. If the number of UEs employing a common spreading factor is greater than or equal to the number of rake receivers left for use, in step 830, the common spreading factor is allocated to a UE sub-sector RAKE receiver in step 835. The next lowest spreading factor is then selected, in step 840, and a further determination is made as to whether the number of UEs employing a common spreading factor is greater than or equal to the number of rake receivers left for use, as shown in step 835. Thus, this process continues until the allocation algorithm determines that multiple UEs are allocated on a common SF and that the number is less than the number of available RAKE receivers. Thereafter, the allocation algorithm transitions to a prioritization stage, by determining those UEs that should be provided with the highest priority, as shown in step 845.

Those UEs that have the highest integrated TPC are required, since this is indicative that these UEs are most likely to be in a dropped call situation. In this regard, the allocation algorithm selects the received signal from the user having the highest integrated TPC, as shown in step 850. A determination is then made as to whether the number of UEs employing a common integrated TPC is greater than or equal to the number of rake receivers left for use. If the number of UEs employing a common integrated TPC is greater than or equal to the number of rake receivers left for use, in step 830, the common spreading factor is allocated to a UE sub-sector RAKE receiver in step 860. The next highest integrated TPC is then selected, in step 865 the algorithm loops back, and a further determination is made as to whether the number of UEs employing a common integrated TPC is greater than or equal to the number of rake receivers left for use, as shown in step 855. Thus, this process continues until the allocation algorithm determines that multiple UEs are allocated on a common TPC and that the number is less than or equal to the number of available RAKE receivers. When all rake receiver resources are utilised, then the algorithm waits for receiver paths to become available in step 870, at which point it intercepts the start of the algorithm.

In one embodiment of the invention, according to the preceding descriptions, elements of this invention may be used in different classes of wireless serving equipment, these classified as macro, micro, pica and femto base stations. Call processing capability and radiative power varies according to the classification type.

In one embodiment of the invention, according to the preceding descriptions, elements of this invention may be co-located with the antenna radiating elements, for example located on the same physical mounting structure within, say, five meters of each other.

In one embodiment of the invention, according to the preceding descriptions elements of this invention, co location of the antenna radiating elements may exist on the same physical structure, for example a panel antenna array device.

Referring now to FIG. 9, there is illustrated a typical computing system 900 that may be employed to implement signal processing functionality in embodiments of the invention. Computing systems of this type may be used in access points and wireless communication units. Those skilled in the relevant art will also recognize how to implement the invention using other computer systems or architectures. Computing system 900 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 900 can include one or more processors, such as a processor 904. Processor 904 can be implemented using a general or special-purpose processing engine such as, for example, a microprocessor, microcontroller or other control logic. In this example, processor 904 is connected to a bus 902 or other communications medium.

Computing system 900 can also include a main memory 908, such as random access memory (RAM) or other dynamic memory, for storing information and instructions to be executed by processor 904. Main memory 908 also may be used for storing temporary variables or other intermediate information during execution of instructions to be executed by processor 904. Computing system 900 may likewise include a read only memory (ROM) or other static storage device coupled to bus 902 for storing static information and instructions for processor 904.

The computing system 900 may also include information storage system 910, which may include, for example, a media drive 912 and a removable storage interface 920. The media drive 912 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 918 may include, for example, a hard disk, floppy disk, magnetic tape, optical disk, CD or DVD, or other fixed or removable medium that is read by and written to by media drive 912. As these examples illustrate, the storage media 918 may include a computer-readable storage medium having particular computer software or data stored therein.

In alternative embodiments, information storage system 910 may include other similar components for allowing computer programs or other instructions or data to be loaded into computing system 900. Such components may include, for example, a removable storage unit 922 and an interface 920, such as a program cartridge and cartridge interface, a removable memory (for example, a flash memory or other removable memory module) and memory slot, and other removable storage units 922 and interfaces 920 that allow software and data to be transferred from the removable storage unit 918 to computing system 900.

Computing system 900 can also include a communications interface 924. Communications interface 924 can be used to allow software and data to be transferred between computing system 900 and external devices. Examples of communications interface 924 can include a modem, a network interface (such as an Ethernet or other NIC card), a communications port (such as for example, a universal serial bus (USB) port), a PCMCIA slot and card, etc. Software and data transferred via communications interface 924 are in the form of signals which can be electronic, electromagnetic, and optical or other signals capable of being received by communications interface 924. These signals are provided to communications interface 924 via a channel 928. This channel 928 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product' 'computer-readable medium' and the like may be used generally to refer to media such as, for example, memory 908, storage device 918, or storage unit 922. These and other forms of computer-readable media may store one or more instructions for use by processor 904, to cause the processor to perform specified operations. Such instructions, generally referred to as 'computer program code' (which may be grouped in the form of computer programs or other groupings), when executed, enable the computing system 900 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 900 using, for example, removable storage drive 922, drive 912 or communications interface 924. The control logic (in this example, software instructions or computer program code), when executed by the processor 904, causes the processor 904 to perform the functions of the invention as described herein.

It will be appreciated that, for clarity purposes, the above description has described embodiments of the invention with reference to different functional units and processors. However, it will be apparent that any suitable distribution of functionality between different functional units or processors, for example with respect to the beamforming logic or multi-path rake receiver combining logic, may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors or configurable logic components such as FPGA devices. Thus, the elements and components of an embodiment of the invention may be physically, functionally and logically implemented in any suitable way. Indeed, the functionality may be implemented in a single unit, in a plurality of units or as part of other functional units.

It is envisaged that embodiments of the invention aim to provide spatial filtering to uplink signals that can significantly reduce interference in a cell sector, without the drawbacks of quickly changing multi-path effects. In particular, an efficient arrangement has been described that does not incur a huge increase in functional resources.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

The invention claimed is:

1. A wireless cellular communication system comprising a network element operably coupled to an antenna array that is capable of receiving concurrently wireless communication signals on a common carrier frequency from more than one remote wireless communication unit, wherein the antenna array comprises a plurality of radiating elements and where the network element comprises:
   first beam-former logic arranged to create a radiation pattern that comprises a sector beam by at least one first radiating element of the plurality of radiating elements; and
   second beam-former logic arranged to create a radiation pattern that comprises a major portion of at least one sub-sector beam within the sector beam by
   at least one second radiating element of the plurality of radiating elements such that the at least one sub-sector beam and the sector beam are of a common polarization on the common carrier frequency;
   such that the first beam-former logic and second beam-former logic simultaneously process wireless communication signals emanating from more than one remote wireless communication unit using both the sector beam and the at least one sub-sector beam.

2. The wireless communication system of claim 1, wherein the plurality of radiating antenna elements comprise a co-located fulcrum of beam creation.

3. The wireless communication system of claim 1, wherein the at least one sub-sector beam is created such that it has a narrower horizontal or vertical azimuth angular radiation pattern than the created sector beam.

4. The wireless communication system of claim 1, wherein the antenna array comprises an active antenna array supporting dedicated signal processing per antenna array element.

5. The wireless communication system of claim 1, wherein the at least one first radiating element of the plurality of radiating elements and the at least one second radiating element of the plurality of radiating elements comprise the same radiating elements.

6. The wireless communication system of claim 5, wherein the network element comprises or is operably coupled to maximally ratio combining logic arranged to respectively combine signals received on the sector beam and combine signals received on the at least one sub-sector beam for each uplink channel.

7. The wireless communication system of claim 6, wherein the maximally ratio combining logic applies at least one from a group consisting of:
   different proportionality constants to signals from each rake receiver output path; and
   a weighting on each remote wireless communication unit signal on each receiver path associated with the sector beam created by the first beam-former logic and the at least one sub-sector beam created by the second beam-former logic.

8. The wireless communication system of claim 5, wherein the network element further comprises allocation logic arranged to allocate rake receiver fingers of the plurality of rake receivers to received signals according to at least one from a group of:
   spreading factor of the received signal; and
   transmit power control, TPC, of the received signal.

9. The wireless communication system of claim 8, wherein the allocation logic is arranged to first allocate receiver fingers of the plurality of rake receivers to received signals according to at least one from a group of:
   a lowest spreading factor of the received signal; and
   a highest transmit power control, TPC, of the received signal.

10. The wireless communication system of claim 1, wherein the network element comprises or is operably coupled to rake receiver logic comprising a plurality of rake receivers operably coupled to beam-former signal processing logic comprising at least the first beam-former logic and second beam-former logic and arranged to separately receive signals associated with the sector beam and the at least one sub-sector beam.

11. The wireless communication system of claim 10, wherein a first number of the plurality of rake receivers associated with processing the sector beam is greater than a second number of the plurality of rake receivers associated with processing the at least one sub-sector beam.

12. The wireless communication system of claim 11, wherein the beam-former signal processing logic processing the sector beam and the at least one sub-sector beam comprises diversity logic arranged to utilize polarization diversity to one or more of the sector beam and the at least one sub-sector beam.

13. The wireless communication system of claim 12, wherein the network element comprises allocation logic arranged to selectively allocate at least one remote communication unit in a communication path that employs polarization diversity.

14. The wireless communication system of claim 10, wherein the network element comprises or is operably coupled to multi-user detector logic operably coupled to the plurality of rake receivers, and arranged to minimize signal interference on a plurality of remote communication units based on the plurality of outputs from the rake receiver logic.

15. The wireless communication system of claim 10, wherein the beam-former signal processing logic comprising extrapolation logic to create a virtual antenna signal from two or more antenna signals and apply the virtual antenna signal in creating a sector beam-form and/or sub-sector beam-form.

16. The wireless communication system of claim 1, wherein the wireless communication system is a $3^{rd}$ Generation Partnership Project wideband code division multiple access, WCDMA, cellular communication system and wherein the network element comprises control channel logic arranged to process at least one from a group of: dedicated physical control channel, DPCCH, information on each path, and dedicated physical data channel, DPDCH, information on each path to determine a weighting to be applied to each receiver path.

17. The wireless communication system of claim 1, wherein the major portion of the at least one sub-sector beam within the sector beam comprises at least 80% of the at least one sub-sector beam.

18. The wireless communication system of claim 1, wherein the wireless communication system comprises a wireless serving communication unit within the Earth's atmosphere and the remote wireless communication unit comprises a geo-stationary or orbiting satellite.

19. A network element coupled to an antenna array of a wireless cellular communication system and for processing beam-forming signals of antenna elements in an antenna array, the network element comprising:
   logic arranged to receive concurrently wireless communication signals on a common carrier frequency from more than one remote wireless communication unit via a plurality of antenna elements;
   a plurality of rake receivers arranged to receive the wireless signals wherein a first set of received signals is received from first beam-forming logic associated with a sector beam and a second set of received signals is received from at least one second beam-forming logic associated with creating a major portion of the at least one sub-sector beam within the sector beam wherein the at least one sub-sector beam and the sector beam are of a common polarization on the common carrier frequency; and logic for separately and simultaneously processing wireless communication signals emanating from more than one remote wireless communication unit output from the plurality of rake receivers associated with the sector beam and the at least one sub-sector beam.

20. A method for controlling antenna elements in an antenna array of a wireless cellular communication system that comprises a network element operably coupled to the antenna array for communicating with a remote wireless communication unit, the method comprising the steps of:
configuring a first radiating element of the antenna array by first beam-former logic to create a radiation pattern that comprises a sector beam;
configuring at least one second radiating element of the antenna array by second beam-former logic to create a major portion of at least one sub-sector beam within the sector beam wherein the at least one sub-sector beam and the sector beam are of a common polarization on a common carrier frequency; and
simultaneously processing wireless communication signals emanating from more than one remote wireless communication unit using both the sector beam and the at least one sub-sector beam.

21. A method for controlling antenna elements as in claim 20, wherein the method is embodied in a non-transitory tangible computer program product comprising executable program code for controlling antenna elements in an antenna array of a wireless cellular communication system that comprises a network element operably coupled to the antenna array for communicating with a remote wireless communication unit.

22. A method for processing beam-forming signals of antenna elements in an antenna array of a wireless cellular communication system that comprises a network element operably coupled to the antenna array for communicating with a remote wireless communication unit, the method comprising the steps of:
receiving a first signal at an at least one first radiating element of a plurality of radiating elements of the antenna array;
creating by first beam-former logic a radiation pattern that comprises a sector beam;
receiving a second signal at an at least one second radiating element of the plurality of radiating elements;
creating by first beam-former logic a radiation pattern that comprises a major portion of at least one sub-sector beam located within the sector beam by at least one second radiating element of the plurality of radiating elements wherein the at least one sub-sector beam and the sector beam use the same carrier frequency;
applying signals received at the plurality of antenna elements to a plurality of rake receivers; and
separately processing signals output from the plurality of rake receivers associated with the sector beam and the at least one sub-sector beam.

23. A method for processing beam-forming signals as in claim 22, wherein the method is embodied in a non-transitory tangible computer program product comprising executable program code stored thereon for processing beam-forming signals of antenna elements in an antenna array of a wireless cellular communication system that comprises a network element operably coupled to the antenna array for communicating with a remote wireless communication unit.

* * * * *